United States Patent [19]
Ohiwa

[11] Patent Number: 5,699,113
[45] Date of Patent: Dec. 16, 1997

[54] IMAGE PROCESSING METHOD AND APPARATUS IN WHICH THE LEVEL OF ENCODING IS BASED ON THE LEVEL OF OPTICAL ZOOM

[75] Inventor: Yasuyuki Ohiwa, Inagi, Japan

[73] Assignee: Canon Kabushiki Kaisha, Tokyo, Japan

[21] Appl. No.: 506,622

[22] Filed: Jul. 25, 1995

[30] Foreign Application Priority Data

Jul. 29, 1994 [JP] Japan .................... 6-178574

[51] Int. Cl.⁶ .................................... H04N 7/24
[52] U.S. Cl. ............................ 348/240; 348/358
[58] Field of Search ........................ 348/581, 240, 348/390, 347, 352, 358; H04N 7/24

[56] References Cited

U.S. PATENT DOCUMENTS

| | | | |
|---|---|---|---|
| 4,739,411 | 4/1988 | Bolton | 348/346 |
| 5,402,171 | 3/1995 | Tagami et al. | 348/219 |

FOREIGN PATENT DOCUMENTS 7-107446  4/1995  Japan .................. H04N 7/24

OTHER PUBLICATIONS

Bernard E. Keiser, Broadband Coding, Modulation, and Transmission Engineering, p. 161, 1989.

*Primary Examiner*—John K. Peng
*Assistant Examiner*—Nathan J. Flynn
*Attorney, Agent, or Firm*—Fitzpatrick, Cella, Harper & Scinto

[57] ABSTRACT

According to this invention, an image processing apparatus which allows detailed observation of the point of interest upon zooming of a camera, includes an input unit (1000, 1002) for inputting image information, and an encoding unit (1003, 1004) for encoding the input image information.

34 Claims, 6 Drawing Sheets

IMAGE PROCESSING METHOD AND APPARATUS IN WHICH THE LEVEL OF ENCODING IS BASED ON THE LEVEL OF OPTICAL ZOOM

BACKGROUND OF THE INVENTION

The present invention relates to an image processing method and apparatus and, more particularly, to a method which comprises a communication terminal apparatus and an image input camera, and generates an image signal for transmitting image information to another communication terminal apparatus using a high-precision information service network (e.g., an ISDN) or a special-purpose line.

Conventionally, a method of communicating video signals, audio signals, data signals, and the like between a plurality of remote points using a high-precision information service network such as an ISDN or a special-purpose line is known.

Figure 1:
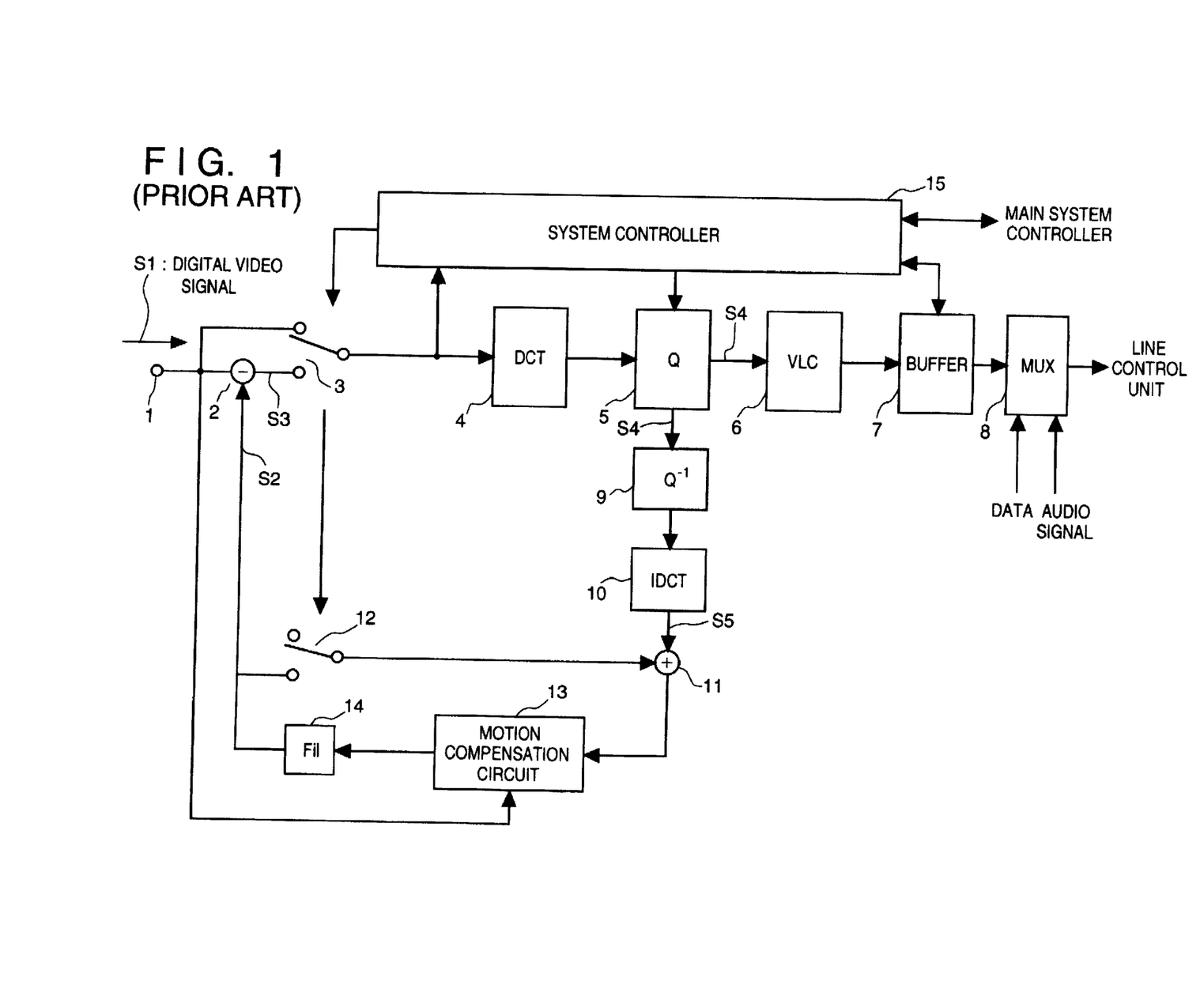
FIG. 1 is a block diagram showing the arrangement of the entire conventional image processing apparatus.

In this case, it is important to reduce the transmission rate of image data to be transmitted by removing redundant components of a video signal using an apparatus for encoding and compressing a motion image. As a method of encoding and compressing it, a circuit with the arrangement shown in, e.g., FIG. 1 is popularly used. More specifically, the circuit shown in FIG. 1 divides each frame of an image in units of predetermined blocks, and orthogonally transforms, quantizes, and encodes the blocks to attain motion-compensated interframe prediction.

Referring to FIG. 1, a motion image video signal S1 input from an input terminal 1 has been converted into a digital signal in an arbitrary format, and is supplied to a motion compensation circuit 13. The motion compensation circuit 13 compares the input image with the previous frame image stored in its internal memory.

The motion compensation circuit 13 divides one frame image into a plurality of blocks each having an arbitrary size, and detects their motion vectors. Upon detection of the motion vectors, motion-compensated interframe prediction is performed on the basis of the image data of the previous frame, and predicted image data is output from the motion compensation circuit 13.

The output predicted image data is filtered through a two-dimensional spatial filter in a filter 14, and the filtered signal is supplied to a subtracter 2. The subtracter 2 performs a subtraction between the motion image video signal S1 input from the input terminal 1 and the predicted image data S2 supplied from the filter 14, and outputs the resulting difference signal to a switch 3.

The switch 3 supplies the output from the subtracter 2 as predicted error data S3 to an orthogonal transform circuit, e.g., a discrete cosine transform (DCT) circuit 4. The predicted error data S3 is orthogonally transformed by the DCT circuit 4 in units of arbitrary blocks, and the transformed data is supplied to a quantization circuit (Q) 5.

The quantization step of the quantization circuit 5 is determined by a system controller 15. The input predicted error data S3 is quantized on the basis of the quantization step determined by the system controller 15.

Image data S4 quantized by the quantization circuit 5 is supplied to an inverse quantization circuit 9, and is inversely quantized. Thereafter, the inversely quantized data is supplied to an inverse orthogonal transform circuit 10, and is subjected to inverse orthogonal transformation. The transformed data is then supplied to an adder 11.

The adder 11 adds reproduced and predicted error data S5 to the predicted image data S2 supplied from the motion compensation circuit 13 through a switch 12, and stores the sum data in an internal memory (not shown) of the motion compensation circuit 13.

The image data S4 quantized by the quantization circuit 5 is subjected to variable length coding by a variable length coding circuit (VLC) 6, and the coded data is supplied to a buffer 7. After the data is temporarily stored in the buffer 7, the data is supplied to a data multiplexing circuit 8, and is multiplexed with audio data and other data while being subjected to output control. The multiplexed data is supplied to a line control unit.

The system controller 15 manages the entire encoding state, and for example, coarsens/diminishes the quantization step of the quantization circuit 5 in correspondence with the amount of data stored in the buffer 7.

When an input image includes, e.g., a scene change, and the amount of the change exceeds the threshold value till which motion compensation is possible, or when motion compensation is unnecessary, the switch 3 and a switch 12 are controlled to be switched to the input image side. Then, control is made in correspondence with an externally input selection setting signal for selecting one of the image quality and transmitting time priority modes upon transmission of motion images onto a transmission path.

Figure 2:
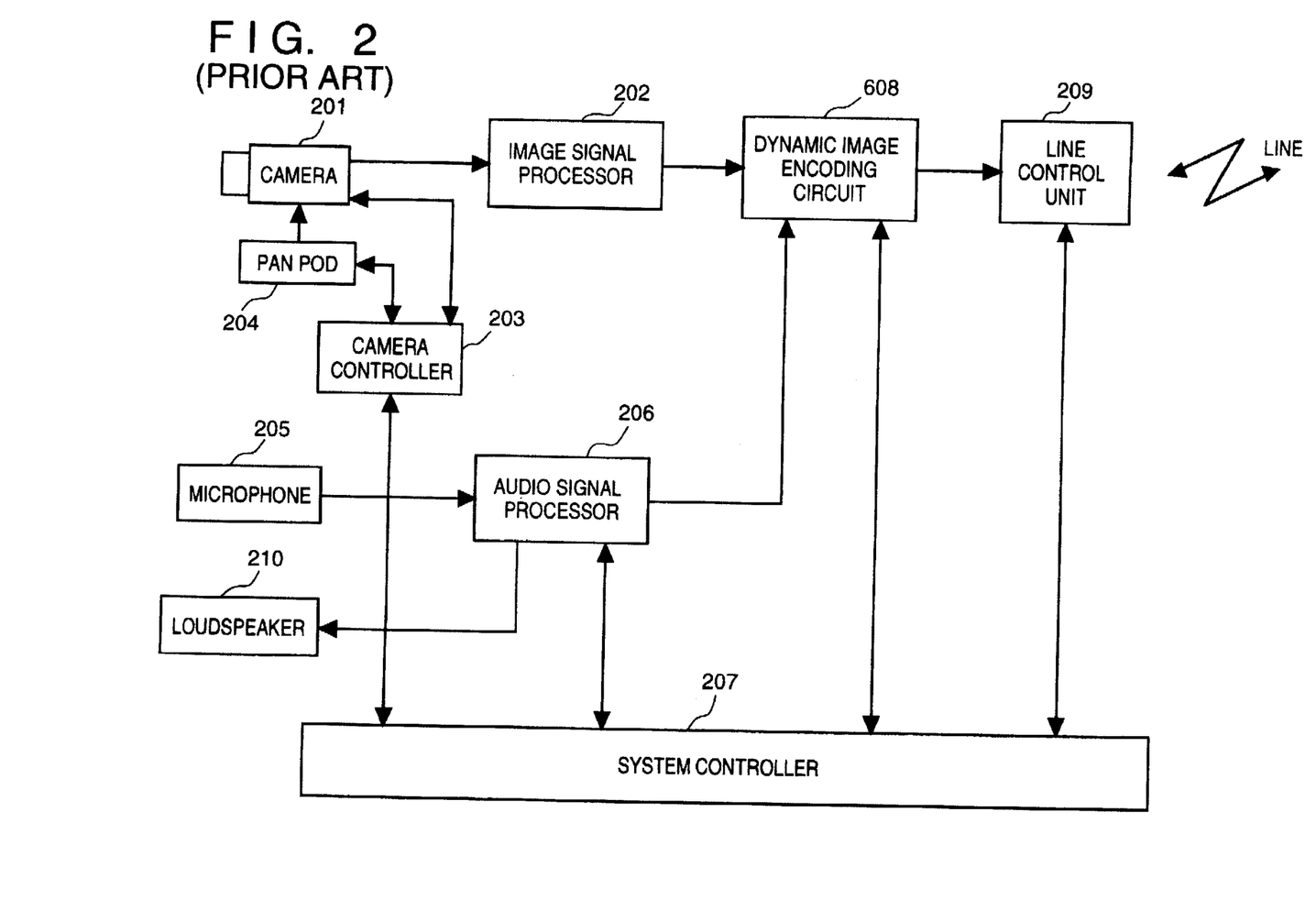
FIG. 2 is a schematic block diagram showing the arrangement of a motion image encoding circuit used in the conventional image processing apparatus.

FIG. 2 is a block diagram showing an example of an image processing apparatus which uses the above-mentioned motion image encoding circuit, and includes a camera controller used in, e.g., a television meeting system, a video telephone set or the like. More specifically, a circuit block for transferring image data input from a camera or audio data input from a microphone to a remote station or receiving and processing data from a remote station, and a block, called a codec, for performing other data processing are combined as a system.

Referring to FIG. 2, reference numeral 201 denotes a CCD camera; 202, a camera input image signal processor; 203, a camera controller; 204, a pan pod for determining the camera direction; 205, an audio input microphone; 206, an input audio signal processor; 207, a system controller; and 608, a motion image encoding circuit.

Reference numeral 209 denotes a line control unit for receiving a camera control signal from a remote station, and transmitting a status information signal. Although not shown in FIG. 2, the apparatus also includes a circuit for demodulating and displaying image and audio signals from a remote station.

The operation of the image processing apparatus with the arrangement shown in FIG. 2 will be described below. An image signal input by the CCD camera 201 is converted into an outputtable video signal and is then converted into a digital video signal in the image signal processor 202. The digital video signal is then supplied to the motion image encoding circuit 608. The digital video signal is compressed by the motion image encoding circuit 608, and the compressed signal is supplied to the line control unit 209.

An audio signal is input from the microphone 205. The audio signal is amplified into an outputtable signal and is compressed by digital conversion in the audio signal processor 206. The digital audio signal is then supplied to the motion image encoding circuit 608. The audio signal is multiplexed with image data and data from the system controller 207 in the motion image encoding circuit 608.

The image signal, audio signal, and various data input to the line control unit 209 via the above-mentioned circuits are converted into transmission data to be sent to another station, and the transmission data is transmitted via a line.

The camera 201 and the microphone 205 are controlled by a control signal (not shown) input via the line control unit 209. The control signal has a predetermined format.

When a control signal is input from an external apparatus to the line control unit 209, it is supplied to and interpreted by the system controller 207.

The system controller 207 supplies the interpreted control signal to the camera controller 203. When the control signal is a signal associated with, e.g., the pan and tilt operations of the camera, the camera controller 203 supplies the control signal to the pan pod 204 to change the direction of the camera 201.

On the other hand, when the control signal is associated with the zooming operation or iris adjustment, the camera controller 203 supplies the control signal to the camera 201 to control it. Furthermore, when the control signal is associated with the volume adjustment of the microphone 205, the system controller 207 supplies the control signal to the audio signal processor 206 to adjust the level of the output signal.

In the above-mentioned image processing apparatus, the motion image encoding circuit 608 performs an operation independently from the entire system. More specifically, it is possible to some extent that the quantization step size of the quantization circuit 5 in the motion image encoding circuit 608 is changed, or the transmitting time or image quality priority mode is selected by changing the frame interval of an image upon execution of the output control of the buffer 7.

However, an externally input control signal can hardly attain flexible control corresponding to the current situation or specific control inherent to the system. For example, when an image signal from the camera 201 is received by a remote monitoring system, if zooming to a point of interest is performed upon a change in an image, a small motion of an image is converted into a large one.

Therefore, even slight motions of narrow object areas considerably disturb the entire image, and it becomes difficult to ascertain details of the situation in this state.

SUMMARY OF THE INVENTION

The present invention has been made in consideration of the above-mentioned problems, and has as its object to allow detailed observation of a point of interest.

The foregoing objective is attained by providing an image processing method comprising: an input step of inputting image information on the basis of a predetermined zoom control amount; and an encoding step of encoding the input image information on the basis of the zoom control amount.

The foregoing objective is also attained by providing an image processing method comprising: an input step of inputting image information; a storage step of storing the input image information; a readout step of reading out the stored image information on the basis of a predetermined readout range control amount; and an encoding step of encoding the readout image information.

The foregoing objective is also attained by providing an image processing apparatus comprising: input means for inputting image information on the basis of a predetermined zoom control amount; and an encoding means for encoding the input image information on the basis of the zoom control amount.

The foregoing objective is also attained by providing an image processing apparatus comprising: an input means for inputting image information; a storage means for storing the input image information; a readout means for reading out the stored image information on the basis of a predetermined readout range control amount; and an encoding means for encoding the readout image information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiment of the invention and, together with the description, serve to explain the principles of the invention.

DETAILED DESCRIPTION OF THE PREFERRED EMBODIMENT

The arrangement of an image processing apparatus according to an embodiment of the present invention will be described below with reference to the accompanying drawings.

Figure 3:
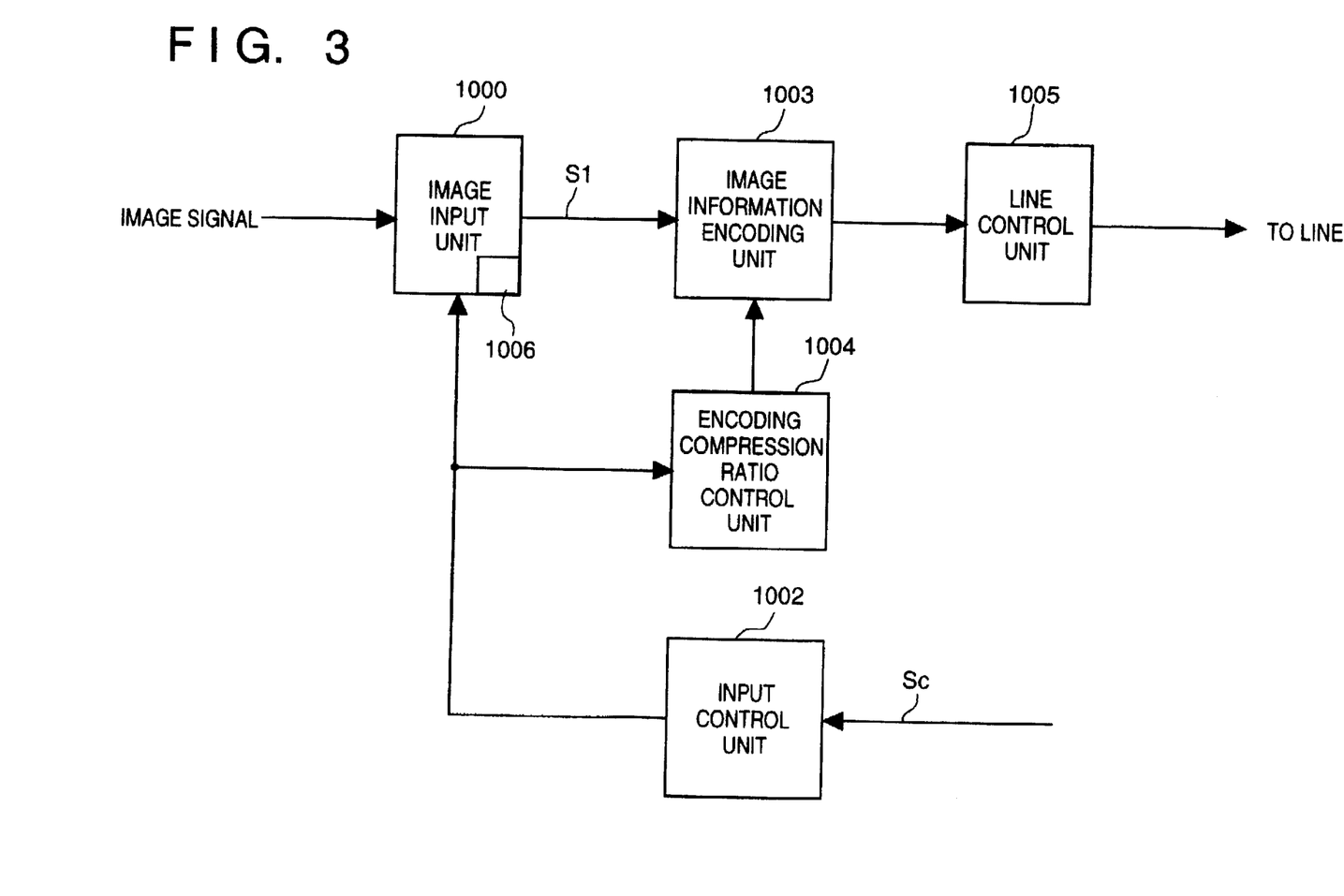
FIG. 3 is a schematic functional block diagram showing the arrangement of an image processing apparatus according to an embodiment of the present invention.

FIG. 3 is a schematic functional block diagram showing the arrangement of an image processing apparatus of this embodiment. As shown in FIG. 3, the image processing apparatus of this embodiment comprises an image input unit 1000, an input control unit 1002, an image information encoding unit 1003, an encoding compression ratio control unit 1004, and a line control unit 1005.

The image input unit 1000 inputs image information. For example, in this embodiment, the image input unit 1000 stands for a video camera and/or an image processing unit for filtering and A/D converting the input image. The input image information may be temporarily stored in an internal memory 1006 of the image input unit 1000.

The input control unit 1002 controls the input operation of image information by the image input unit 1000, i.e., controls the input operation in accordance with an externally input control signal Sc.

The image information encoding unit 1003 encodes image signal (S1) input by the image input unit 1000 by a predetermined encoding method. For example, a variable length encoding method for assigning a shorter length of a code to a code word with a high probability of occurrence, and assigning a larger length of a code to a code word with a low probability of occurrence is used.

The encoding compression ratio control unit 1004 controls the encoding operation of the image information encoding unit 1003 in correspondence with the control state of the image pickup operation of the image input unit 1000 by the input control unit 1002, thereby changing the compression ratio upon encoding of input image information S1.

The line control unit 1005 converts an image signal, audio signal, and various data input via the above-mentioned circuit into data to be transmitted to a remote point, and outputs the converted data via a line.

In this embodiment, the input control unit 1002 performs zooming control of the video camera according to the control signal Sc, which designates an amount of the zooming.

In a zoom-in (enlargement) operation of the zooming control, the compression ratio upon encoding of image information in the image information encoding unit 1004 is decreased, and in a zoom-out (reduction) operation, the compression ratio upon encoding is increased.

With this control, since the encoding operation of the image information encoding unit 1004 can be controlled in correspondence with the input operation of image information, the image compression ratio can be changed in synchronism with the zooming operation of the camera. In this manner, the resolution in the zoom-up state is increased, so that a point of interest can be observed in detail.

The image processing apparatus, which has the same idea as one of the foregoing arrangement (shown in FIG. 3), according to the embodiment of the present invention will be described in detail below with reference to FIGS. 4 to 6.

Figure 4:
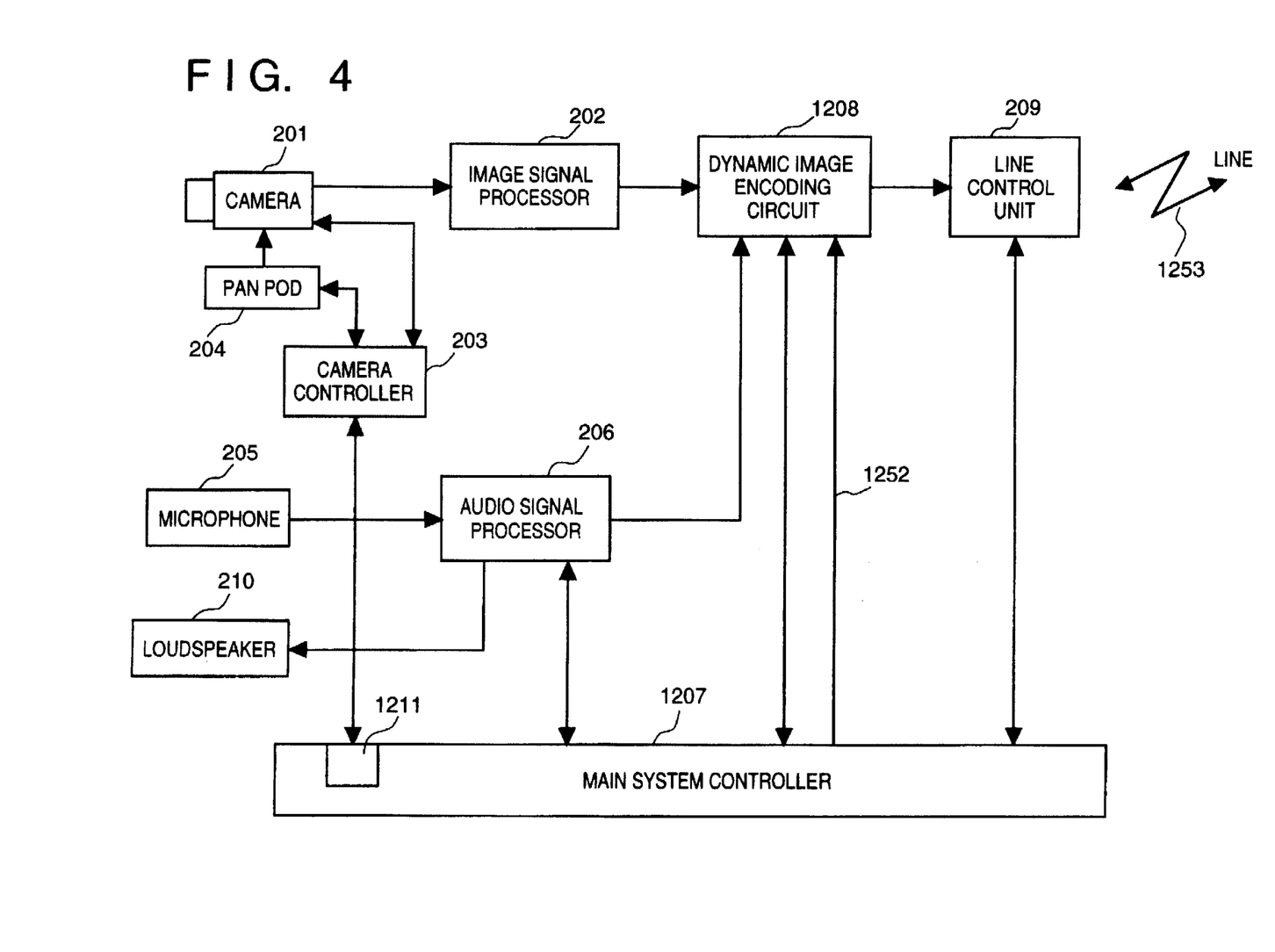
FIG. 4 is a block diagram showing the arrangement of the entire image processing apparatus according to the embodiment shown in FIG. 3.
Figure 5:
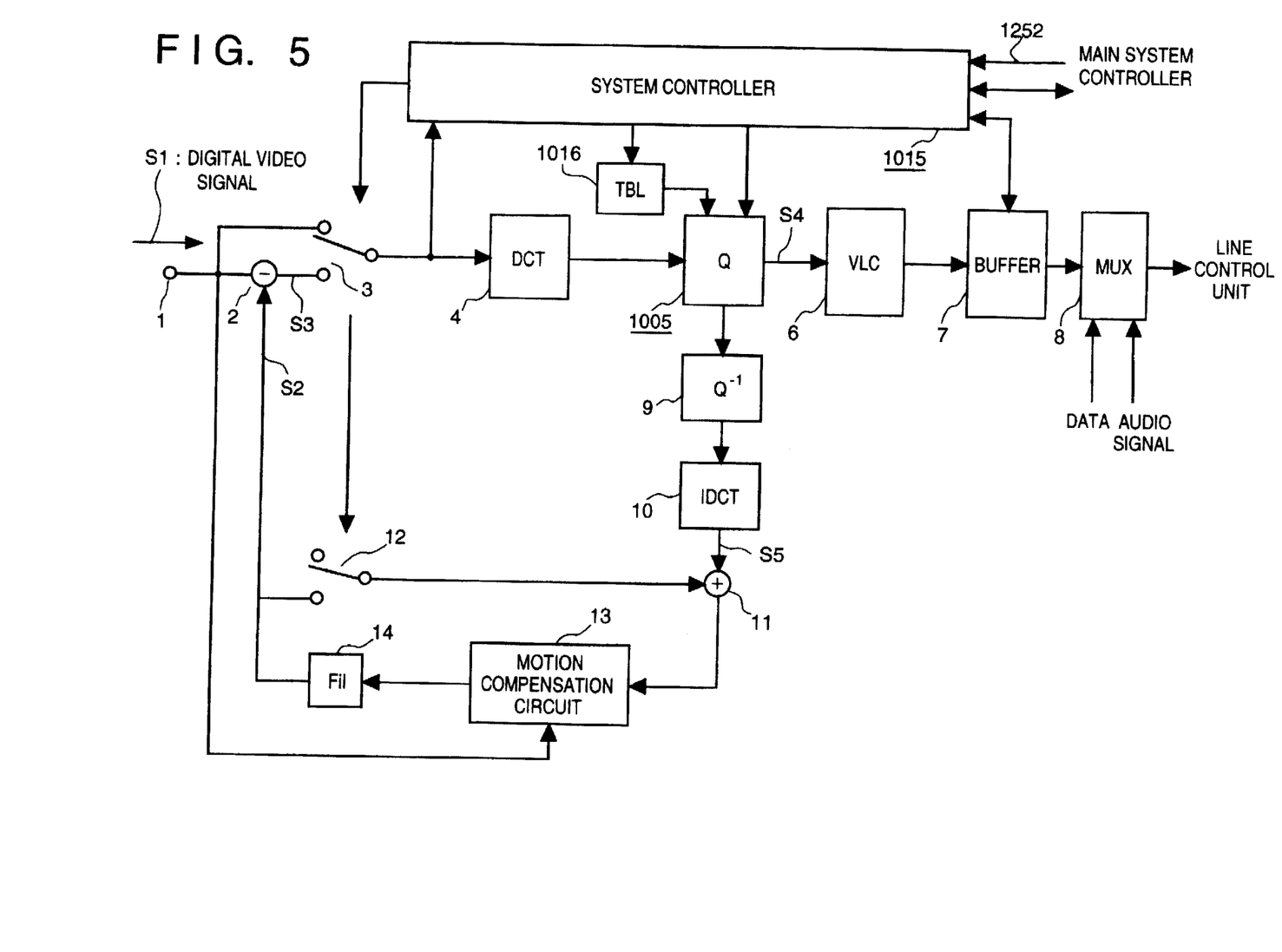
FIG. 5 is a schematic block diagram showing the arrangement of a motion image encoding circuit used in the image processing apparatus according to the embodiment shown in FIG. 3.

Herein, the same blocks in FIG. 4 and FIG. 5 as the ones in FIG. 1 and FIG. 2 in terms of their functions are assigned the same reference numerals.

Figure 6:
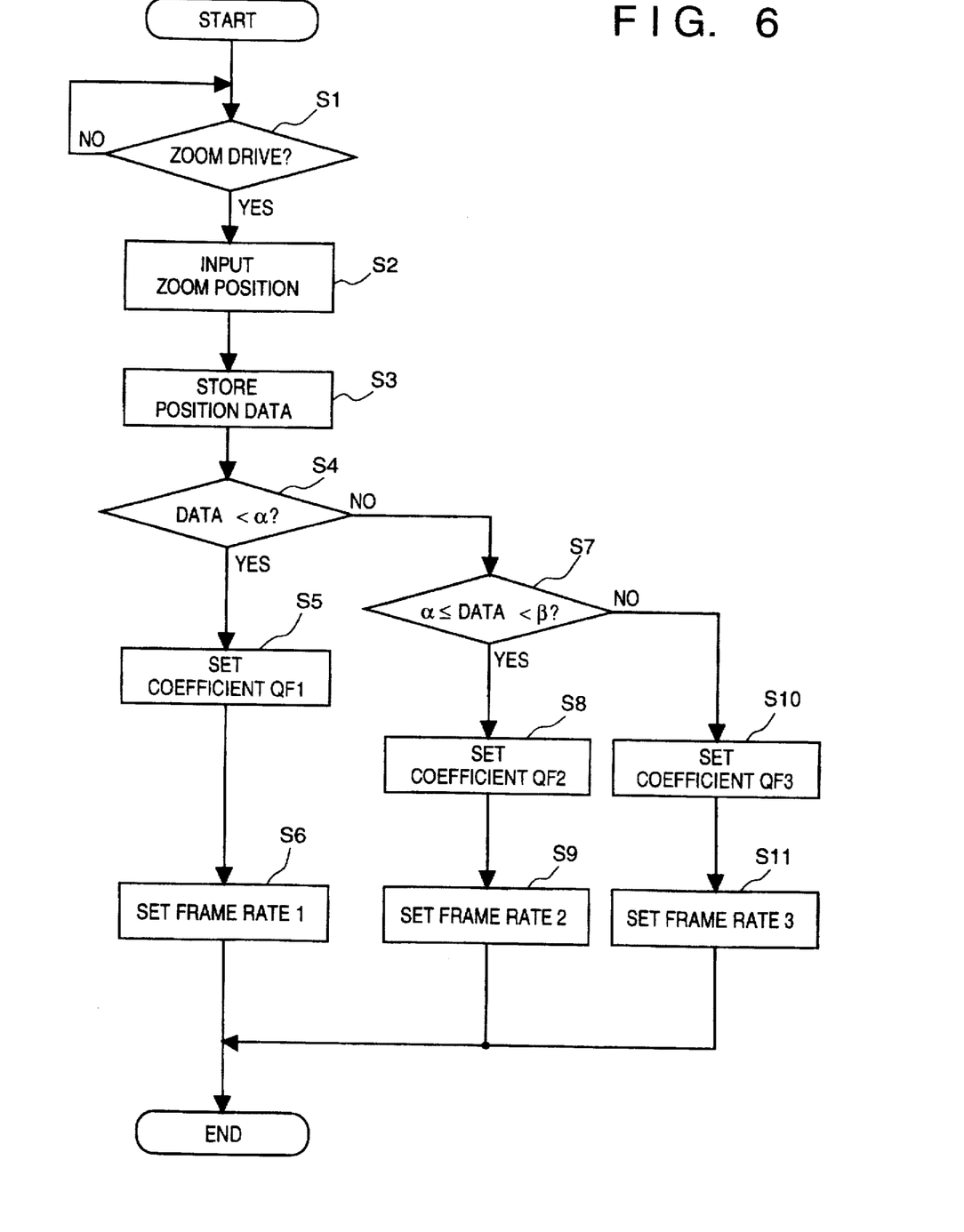
FIG. 6 is a flow chart showing the operation of the image processing apparatus according to the embodiment shown in FIG. 3.

FIG. 4 is a schematic block diagram showing the arrangement of the entire image processing apparatus, FIG. 5 is a block diagram showing the arrangement of a motion image encoding circuit 1208 in FIG. 4, and FIG. 6 is a flow chart for explaining the operation of the image processing apparatus.

Referring to FIG. 4, execution of zooming of a video camera 201 is instructed by a command externally input via a line 1253 or a command input from an operation unit (not shown).

The video camera 201 transfers image data to an image processing unit 202 according to the zooming command. The transferred image data is subjected to image processing and is stored in an internal buffer 1212 embedded in the image processing unit 202. Then the stored image data is transferred to a motion image encoding circuit 1205.

Upon reception of the zoom execution instruction, a main system controller 1207 supplies a zoom command to a camera controller 203. The camera controller 203 keeps supplying the zoom command to the camera 201 while it receives this command, thereby controlling the camera zoom operation. While the zoom command is kept supplied, the main system controller 1207 reads out zoom driving position data from the camera 201 via the camera controller 203, and stores the readout data in its internal memory 1211.

The operation will be described below with reference to the flow chart shown in FIG. 6.

A motion image encoding circuit 1208 communicates with the main system controller 1207 at predetermined intervals to monitor if the zoom control is performed (step S1). If it is detected that the zoom control is started and it is also detected that the zoom control ends, a system controller 1015 in the motion image encoding circuit 1208 inputs zoom focal length data from the main system controller 1207 through a zoom data line 1252 (step S2), and stores the input data in its internal memory (not shown) (step S3). The flow advances to step S4, and the input focal length data is compared with a predetermined wide-end focal length.

Upon comparison of the data, it is checked first if the data is smaller than a predetermined focal length α (mm). If it is determined that the data is smaller than the focal length α (mm), i.e., if YES in step S4, it is determined that the focal length data is closer to the wide-end focal length, and the flow advances to step S5 to set the quantization step in the motion priority mode.

The quantization step is set as follows. The system controller 1015 in FIG. 5 supplies a table write command to a quantization coefficient table memory 1016 to read out a first quantization coefficient QF1 from the quantization coefficient table memory 1016, and supplies the readout coefficient to a quantization circuit 1005. Thus, the quantization circuit 1005 sets a coarse quantization step in correspondence with the first quantization coefficient QF1.

The flow advances to step S6, and the system controller 1015 increase the frame rate by setting the data output rate of a buffer circuit 7 to be rate 1, thereby selecting the motion priority mode which has low image quality but a large number of frames. Then, processing halts until the next zoom operation is performed.

On the other hand, if NO in step S4, the flow advances to step S7 to check if the readout data is smaller than a predetermined value β (mm). If YES in step S7, the system controller 15 supplies a table write command to the quantization coefficient table memory 1016 to read out a second quantization coefficient QF2 from the quantization coefficient table memory 1016 and supplies the readout coefficient to the quantization circuit 1005 in the same manner as described above. With this control, a quantization step rate finer than that set based on the first quantization coefficient QF1 is set.

The flow then advances to step S9, and the system controller 1015 sets the data output rate of a buffer circuit 7 to be rate 2, so that the frame rate assumes a value smaller than frame rate 1.

On the other hand, if NO in step S7, the flow advances to step S10 to execute the same processing as in step S8. Thus, a third quantization coefficient QF3 is read out from the quantization coefficient table memory 1016 and is supplied to the quantization circuit 1005. The flow then advances to step S11 to set frame rate 3.

With this processing, a fine quantization step is set, and hence, the image quality priority mode which has a low frame rate but high image quality is set. In this manner, the motion priority mode changes to the image quality priority mode as the focal length changes from the wide end to the telephoto end.

In this embodiment, the compression mode is divided into three modes, but the present invention is not limited to this. An H.261 image compression method has been exemplified, but an MPEG or other compression method can be adopted.

In this embodiment, the operation upon input of a motion image has been exemplified. Also, the present invention may be applied to a case wherein a still image is compressed according to a variable quantization step, as a matter of course.

The zoom operation of the camera 201 is not limited to an optical zoom operation that changes the focal length by moving a lens system but may be attained by an electronic zoom operation that changes the readout range of an image from a CCD or a memory.

Furthermore, image information input from the image input unit 1000 is not limited to one output from the video camera, but may be externally input information.

As described above, according to the present invention, the encoding operation of the image information encoding unit is controlled in correspondence with the input operation of image information by the image input unit, and the image compression ratio is changed in correspondence with the image pickup state of an object by the image input unit. For this reason, when an object image is picked up in a zoom-up state, the image compression ratio can be decreased to obtain a high-resolution image, and the point of interest can be observed in detail.

As many apparently widely different embodiments of the present invention can be made without departing from the spirit and scope thereof, it is to be understood that the invention is not limited to the specific embodiments thereof except as defined in the appended claims.

What is claimed is:

1. An image processing method comprising:
   an input step of inputting image information
   an optical zooming step of optically zooming the image information input by said input step;
   an encoding step of encoding the input image information; and
   a control step of controlling the encoding step on the basis of a zoom control amount determined at said optical zooming step.

2. The method according to claim 1, wherein the zoom control amount includes zoom-in and zoom-out control amounts.

3. The method according to claim 2, wherein the encoding step includes a step of encoding by decreasing a compression ratio of the input image information in a zoom-in mode, and a step of encoding by increasing the compression ratio of the input image information in a zoom-out mode.

4. The method according to claim 2, wherein, at the optical zooming step, a zoom focal length to an object is increased in a zoom-in mode and a zoom focal length to an object is decreased in a zoom-out mode.

5. The method according to claim 2, wherein the input step includes a step of inputting the image information by decreasing the number of input frames per unit time for an object in a zoom-in mode, and a step of inputting the image information by increasing the number of input frames per unit time for the object in a zoom-out mode.

6. The method according to claim 4, wherein, at the control step, the number of input frames per unit time is decreased in the zoom-in mode, and the number of input frames per unit time is increased in the zoom-out mode.

7. The method according to claim 3, wherein the compression ratio is based on a quantization step size of image information.

8. The method according to claim 4, wherein the input step includes a step of inputting image information by increasing the number of input frames per unit time when the zoom focal length to the object is smaller than a predetermined wide-end focal length.

9. The method according to claim 4, wherein the input step includes a step of inputting image information by decreasing the number of input frames per unit time when the zoom focal length to the object is larger than a predetermined telephoto-end focal length.

10. The method according to claim 4, wherein the encoding step includes the step of encoding image information at a high compression ratio when the zoom focal length to an object is smaller than a predetermined wide-end focal length.

11. The method according to claim 4, wherein the encoding step includes a step of encoding image information at a low compression ratio when the zoom focal length to an object is larger than a predetermined telephoto-end focal length.

12. An image processing apparatus comprising:
   input means for inputting image information
   optical zooming means for optically zooming the image information input by said input means;
   encoding means for encoding the input image information; and
   control means for controlling the encoding means on the basis of a zoom control amount of said optical zooming means.

13. The apparatus according to claim 12, wherein the zoom control amount includes zoom-in and zoom-out control amounts.

14. The apparatus according to claim 13, wherein the encoding means includes a means for encoding by decreasing a compression ratio of the input image information in a zoom-in mode, and a means for encoding by increasing the compression ratio of the input image information in a zoom-out mode.

15. The apparatus according to claim 13, wherein the optical zooming means increases a zoom focal length to an object in a zoom-in mode, and decreases a zoom focal length to an object in a zoom-out mode.

16. The apparatus according to claim 13, wherein the input means includes a means for inputting the image information by decreasing the number of input frames per unit time for an object in a zoom-in mode, and a means for inputting the image information by increasing the number of input frames per unit time for the object in a zoom-out mode.

17. The apparatus according to claim 15, wherein the control means decreases the number of input frames per unit time in the zoom-in mode, and increases the number of input frames per unit time in the zoom-out mode.

18. The apparatus according to claim 14, wherein the compression ratio is based on a quantization means size of image information.

19. The apparatus according to claim 15, wherein the input means includes a means for inputting image information by increasing the number of input frames per unit time when the zoom focal length to the object is smaller than a predetermined wide-end focal length.

20. The apparatus according to claim 15, wherein the input means includes a means for inputting image information by decreasing the number of input frames per unit time when the zoom focal length to the object is larger than a predetermined telephoto-end focal length.

21. The apparatus according to claim 15, wherein the encoding means includes the means for encoding image information at a high compression ratio when the zoom focal length to an object is smaller than a predetermined wide-end focal length.

22. The apparatus according to claim 15, wherein the encoding means includes a means for encoding image information at a low compression ratio when the zoom focal length to an object is larger than a predetermined telephoto-end focal length.

23. An image processing apparatus comprising:
   input means for inputting image information;

zooming means for zooming the image information input by said input means; and control means for controlling the frame number of input frames per unit time for an object on the basis of a zoom control amount of said zooming means.

24. Apparatus according to claim 23, wherein the zoom control amount includes zoom-in and zoom-out control amounts.

25. Apparatus according to claim 23, further comprising means for encoding the input image information.

26. Apparatus according to claim 25, wherein the encoding means includes a means for encoding by decreasing a compression ratio of the input image information in a zoom-in mode, and a means for encoding by increasing the compression ratio of the input image information in a zoom-out mode.

27. Apparatus according to claim 25, wherein the input means includes a means for inputting the image information by decreasing the number of input frames per unit time for an object in a zoom-in mode, and means for inputting the image information by decreasing the number of input frames per unit time for the object in a zoom-out mode.

28. Apparatus according to claim 25, wherein the compression ratio is based on a quantization size of image information.

29. Apparatus according to claim 25, wherein the input means includes a means for inputting image information by increasing the number of input frames per unit time when the zoom focal length to the object is smaller than a predetermined wide-end focal length.

30. Apparatus according to claim 25, wherein the input means includes means for inputting image information by decreasing the number of input frames per unit time when the zoom focal length to the object is larger than a predetermined telephoto-end focal length.

31. Apparatus according to claim 25, wherein the encoding means includes means for encoding image information at a high compression ratio when the zoom focal length to an object is smaller than a predetermined wide-end focal length.

32. Apparatus according to claim 25, wherein the encoding means includes means for encoding image information at a low compression ratio when the zoom focal length to an object is larger than a predetermined telephoto-end focal length.

33. Apparatus according to claim 23, wherein the zooming means increases a zoom focal length to an object in a zoom-in mode, and decreases a zoom focal length to an object in a zoom-out mode.

34. Apparatus according to claim 33, wherein the control means decreases the number of input frames per unit time in the zoom-in mode, and increases the number of input frames per unit time in the zoom-out mode.

* * * * *

UNITED STATES PATENT AND TRADEMARK OFFICE
CERTIFICATE OF CORRECTION

PATENT NO. : 5,699,113
DATED : December 16, 1997
INVENTOR(S) : YASUYUKI OHIWA

It is certified that error appears in the above-identified patent and that said Letters Patent is hereby corrected as shown below:

COLUMN 1

Line 9, "comprises" should read --utilizes--.

COLUMN 4

Line 14, "ment" should read --ments--.

COLUMN 7

Line 24, "information" should read --information;--.

COLUMN 8

Line 11, "information" should read --information;--.

Signed and Sealed this

Twenty-first Day of July, 1998

Attest:

BRUCE LEHMAN

Attesting Officer     Commissioner of Patents and Trademarks